United States Patent
Palmer et al.

(10) Patent No.: US 10,635,921 B2
(45) Date of Patent: Apr. 28, 2020

(54) FOOD CONTAINER SYSTEM AND METHOD

(71) Applicant: Kenwood Limited, Hampshire (GB)

(72) Inventors: Paul Palmer, Hampshire (GB); Gilman Grundy, Hampshire (GB)

(73) Assignee: KENWOOD LIMITED (GB)

( * ) Notice: Subject to any disclaimer, the term of this patent is extended or adjusted under 35 U.S.C. 154(b) by 186 days.

(21) Appl. No.: 14/826,459

(22) Filed: Aug. 14, 2015

(65) Prior Publication Data

US 2016/0048720 A1   Feb. 18, 2016

Related U.S. Application Data

(60) Provisional application No. 62/037,142, filed on Aug. 14, 2014.

(51) Int. Cl.

| | |
|---|---|
| *G06K 9/20* | (2006.01) |
| *G06F 16/432* | (2019.01) |
| *B65D 25/54* | (2006.01) |
| *A47J 43/07* | (2006.01) |
| *A47J 36/32* | (2006.01) |

(Continued)

(52) U.S. Cl.
CPC ............ *G06K 9/209* (2013.01); *A47J 36/321* (2018.08); *A47J 43/044* (2013.01); *G06F 16/434* (2019.01); *G06F 16/50* (2019.01); *G06F 16/9554* (2019.01); *G06K 9/20* (2013.01); *A45C 2011/002* (2013.01); *A47J 43/07* (2013.01); *B65D 25/54* (2013.01); *B65D 2203/00* (2013.01); *G06F 1/1632* (2013.01); *G06K 2209/17* (2013.01)

(58) Field of Classification Search
CPC ...... G06K 2209/17; G06K 9/209; G06K 9/20; G06K 9/00214; A45C 2011/002; A45C 11/00; A45C 2011/003; G06T 15/08; B65D 25/56; B65D 2203/00; B65D 25/54; A47J 43/044; A47J 36/321; A47J 43/07; G06F 16/50; G06F 16/9554; G06F 16/434; G06F 1/1632; G06Q 30/016; G01N 21/84

USPC ............................................ 382/110; 206/216
See application file for complete search history.

(56) References Cited

U.S. PATENT DOCUMENTS

| | | | |
|---|---|---|---|
| 4,753,031 A | 6/1988 | Owen | |
| 8,145,854 B1* | 3/2012 | Lee | ............................ A23L 5/00 |
| | | | 711/154 |

(Continued)

FOREIGN PATENT DOCUMENTS

| | | |
|---|---|---|
| CN | 102680414 A | 9/2012 |
| JP | 2001208463 A | 8/2001 |
| JP | 2010061382 A  * | 3/2010 |

OTHER PUBLICATIONS

English translation of JP2010-61382, Mar. 18, 2010, 11 pages.*

(Continued)

*Primary Examiner* — Jon Chang
(74) *Attorney, Agent, or Firm* — Harness, Dickey & Pierce, P.L.C.

(57) ABSTRACT

A container for providing an enclosure for a food item includes a plurality of grading marks and a docking station to dock an electronic device. Yet further, the system includes a processor configured to take one or more pictures of the food item (104) using the electronic device (110), transmit the one or more pictures to a cloud (202), receive recommended recipes for the food item (104) and display the recommended recipes.

25 Claims, 5 Drawing Sheets

(51) Int. Cl.
*A47J 43/044* (2006.01)
*G06F 16/955* (2019.01)
*G06F 16/50* (2019.01)
*A45C 11/00* (2006.01)
*G06F 1/16* (2006.01)

(56) References Cited

U.S. PATENT DOCUMENTS

| | | | | |
|---|---|---|---|---|
| 8,746,063 | B1* | 6/2014 | Lumpkin | G01F 19/007 |
| | | | | 206/315.1 |
| 9,089,059 | B1* | 7/2015 | Haskin | G06F 1/1626 |
| 2006/0196879 | A1* | 9/2006 | Chochinov | B65F 1/06 |
| | | | | 220/665 |
| 2007/0114224 | A1 | 5/2007 | Nagamitsu et al. | |
| 2009/0161907 | A1* | 6/2009 | Healey | B65F 1/14 |
| | | | | 382/100 |
| 2009/0167506 | A1* | 7/2009 | Wong | H05B 6/688 |
| | | | | 340/286.02 |
| 2009/0259687 | A1 | 10/2009 | Do et al. | |
| 2010/0145974 | A1 | 6/2010 | Chen | |
| 2011/0073598 | A1* | 3/2011 | Liscio | B65F 1/10 |
| | | | | 220/211 |
| 2011/0117259 | A1* | 5/2011 | Storek | A47J 36/14 |
| | | | | 426/509 |
| 2012/0179665 | A1* | 7/2012 | Baarman | G06F 19/3475 |
| | | | | 707/709 |
| 2013/0111936 | A1* | 5/2013 | Olson | F25D 23/028 |
| | | | | 62/127 |
| 2014/0026762 | A1* | 1/2014 | Riefenstein | H05B 6/6441 |
| | | | | 99/325 |
| 2014/0063180 | A1* | 3/2014 | Sharma | G08C 19/00 |
| | | | | 348/36 |
| 2014/0104385 | A1 | 4/2014 | Wong et al. | |
| 2014/0300265 | A1* | 10/2014 | Lee | F25D 29/00 |
| | | | | 312/405.1 |
| 2015/0289324 | A1* | 10/2015 | Rober | H05B 6/68 |
| | | | | 219/711 |

OTHER PUBLICATIONS

Kawano et al. "Mirurecipe: A Mobile Cooking Recipe Recommendation System with Food Ingredient Recognition." IEEE International Conference on Multimedia and Expo Workshops, Jul. 15, 2013, 3 pages.*

Search Report from the United Kingdom Intellectual Property Office for corresponding UK Patent App. No. GB1514521.2 dated Sep. 6, 2016 (3 pages).

Search Report from United Kingdom Intellectual Property Office (IPO) for Application No. GB1514521.2 dated Feb. 10, 2016 (5 pages).

* cited by examiner

FOOD CONTAINER SYSTEM AND METHOD

CROSS REFERENCE TO RELATED APPLICATION

This application claims priority to U.S. Provisional Patent Application No. 62/037,142 filed Aug. 14, 2014 which is hereby incorporated by reference.

BACKGROUND OF THE INVENTION

Technical Field

This disclosure relates to food preparation arrangements for example incorporating electrically powered kitchen appliances. Specifically, the disclosure relates to a system for identifying or grading food items and for providing a recipe recommendation to a user.

Discussion

Electrically powered kitchen appliances used for food preparation arrangements include, for example:

1) stand mixers, by which is meant the kind of kitchen appliance in which a mixing bowl is supported on a pedestal which also supports an electric motor and a drive system including a drive outlet, overhead of the bowl, which permits a planetary mixing action to be imparted to tools suspended into the bowl from the overhead drive outlet;

2) food processors, by which is meant the kind of kitchen appliance in which a rotary tool mounted in the base a bowl is driven from beneath the bowl by means of a suitable drive coupling from an electric motor; and 3) blenders, which are similar to food processors, and indeed are often combined therewith, and which include a tool, mounted in a goblet or similar vessel, driven from beneath the goblet.

Such kitchen appliances are well known and established, and each form has respective capabilities; the more expensive stand mixers usually being capable of performing a wider range of functions than the food processors and blenders. Nevertheless, in respect of all such appliances, there is a continuous drive to increase their functionality and general usefulness without substantially increasing their price to the end-user. It is, for example, generally the case that when any of the foregoing appliances is used, the users want to know recipes that they may prepare based on food items available with them. Further, the users may want to access additional information about the available food items including nutritional content, freshness, quality and weight of the food items. The users may want additional information as they are becoming more interested in eating healthier food due to increase in obesity and other health problems. However, it is often difficult for people to follow dietary plans or access recipes that are recommended by doctors to achieve health goals like losing weight or to maintain a healthy weight. This is difficult for users as it is not easy to determine nutritional content of food and often the dietary plans forces them to reduce intake of well-liked food and to increase intake of disliked food, which decreases the user's motivation to strictly follow the dietary plans.

SUMMARY OF THE INVENTION

It is an aspect of the disclosure to provide a system, which is able to quickly and efficiently recommend recipes for the respective food items available with users. Further, the system may provide additional information including nutritional content, freshness, quality and weight of the food items. The recipes may be recommended such that they are healthy and liked by the users. More specifically, the solution to the problems is provided in a way such that it mitigates the existing problems around the implementation of such solutions within the home environment for appliances.

According to the disclosure, a food-grading device comprises a container for providing an enclosure for a food item, wherein the surface of the container includes a plurality of grading marks. The food-grading device further includes a docking station arranged to dock an electronic device facing the enclosures. Yet further, the food-grading device 100 includes a processor configured to take one or more pictures of the food item 104 using the electronic device 110, transmit the one or more pictures to a cloud 202, receive recommended recipes for the food item 104 and display the recommended recipes. Further still, the food-grading device 100 includes a local memory configured to store one or more pictures and additional information of the food item 104, and recommended recipes for the food item 104.

According to another embodiment of the disclosure, the cloud 202 comprising a food database 206 storing pictures and recipes of a plurality of food items and a food-grading service unit 204. The food-grading service unit 204 is configured to receive one or more pictures of the food item 104 from the food-grading device 100, process the one or more pictures of the food item 104 to determine the type and quantity of the food item 104, select one or more recipes based on the type of the food item 104 and transmit information about the one or more recommended recipes.

Technical advantages of particular embodiments include the automatic detection of food items and their quantity based on pictures of the food items. Further, recommending recipes for detected food items and sending instructions to one or more kitchen appliances for the recommended recipes. Accordingly, the functionality of the kitchen appliances may be increased.

Other technical advantages will be readily apparent to one skilled in the art from the following figures, descriptions and claims. Moreover, while specific advantages have been enumerated above, various embodiments may include all, some or none of the enumerated advantages.

In order that the disclosure may be clearly understood and readily carried into effect, certain embodiments thereof will now be described, by way of example only, with reference to the accompanying drawings. The invention extends to any novel aspects or features described and/or illustrated herein.

The invention extends to methods and/or apparatus substantially as herein described and/or as illustrated with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

The invention extends to a container, image processing, apparatus or method as described herein and/or substantially as illustrated with reference to the accompanying drawings.

BRIEF DESCRIPTION OF THE DRAWINGS

The present invention is now described, purely by way of example, with reference to the accompanying diagrammatic drawings, in which.

DETAILED DESCRIPTION OF THE PREFERRED EMBODIMENTS

Figure 1A:
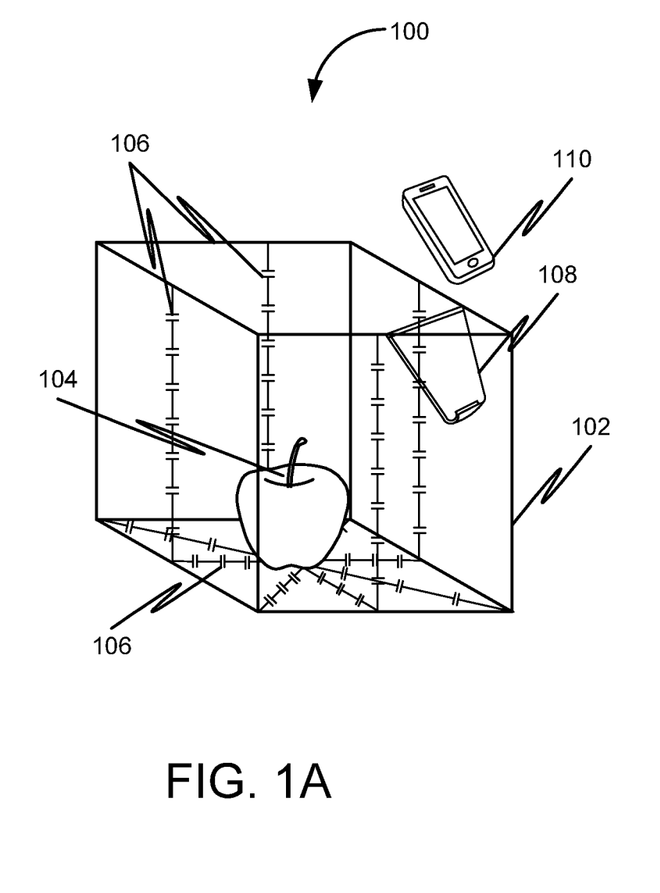
FIG. 1A and FIG. 1B show, in perspective view, one example of a food-grading device according to the present disclosure.
Figure 1B:
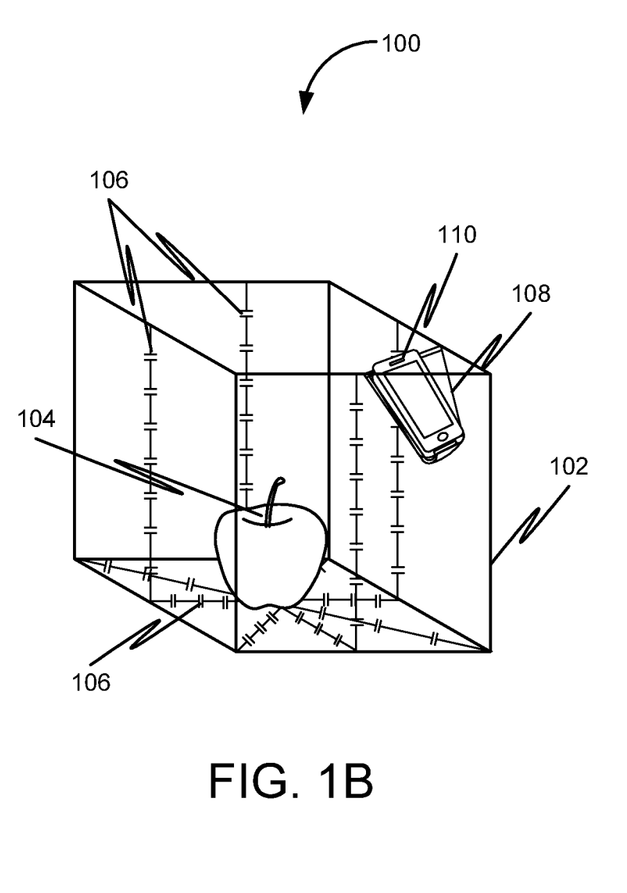

Referring now to FIGS. 1A and 1B, in which corresponding features carry the same reference numbers, a food-grading device 100 comprises a container 102 which acts as an enclosure for a food item 104; for example an apple. The container 102 may include one or more grading marks 106 on the surface of the container 102. Each mark in the grading marks 106 may be an etch, a depression, a raised portion, a print, or any other structure that is clearly observable from inside and outside of the container 102. The grading marks 106 indicate a unit of measurement, such as centimeters or inches.

The container 102 is cube shaped. However, the container 102 may be of any other suitable shape such as spherical, cuboid or conical. The container 102 may have one or more openings that allow a user to place the food item 104 inside the container 102. For example, the one or more side faces of the container 102 may open as a gate or the top face of the container 102 may be a lid that can be lifted of the container 102 to allow the user to place the food item 104 in the container 102. Further, the container 102 may be transparent such that the food item 104 is visible to the user at all times. Yet further, the container 102 is may be hermetically sealable which ensures that no extraneous elements enter the container 102 when the food item 104 is placed in the container 102. The container 102 may further be dishwasher-safe which makes it easy for the user to clean the food-grading device 100. The food-grading device 100 may also include a weighing scale to determine weight of the food item 104. Further, the food-grading device 100 may include one or more sensors to perform chemical analysis of the food item 104. For example, the food-grading device 100 may include an odor sensor that is used to capture the odor given out by the food item 104 and detect chemical nature of odor molecules. The food-grading device 100 may also be connected to a network that includes, but is not limited to, the Internet, LAN, MAN, WAN, or the like.

Further, the food-grading device 100 may include a docking station 108, which is used to dock an electronic device 110 including a smart phone, a tablet, a camera, a 3D scanner and a barcode scanner. In the example shown in FIG. 1B, a smart phone is docked on the docking station 108. The docking station 108 may electronically connect the food-grading device 100 and the electronic device 110 using one or more ports available on the docking station 108. When activated, the electronic device 110 is configured to take pictures of the food item 104. For example, the user may use controls (not shown) available on the outer surface of the food-grading device 100 to instruct the food-grading device 100 to initiate taking pictures using the electronic device 110. Alternatively, the user may directly activate the electronic device 110 to take pictures.

Figure 1C:
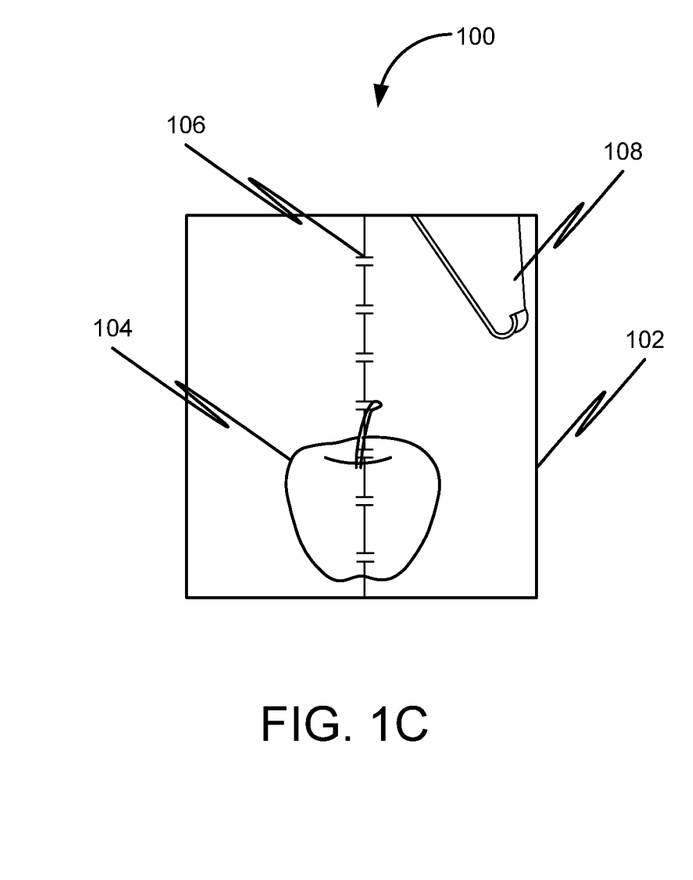
FIG. 1C shows a side view of the food-grading device and FIG. 1D shows a top view of the food-grading device according to the present disclosure.
Figure 1D:
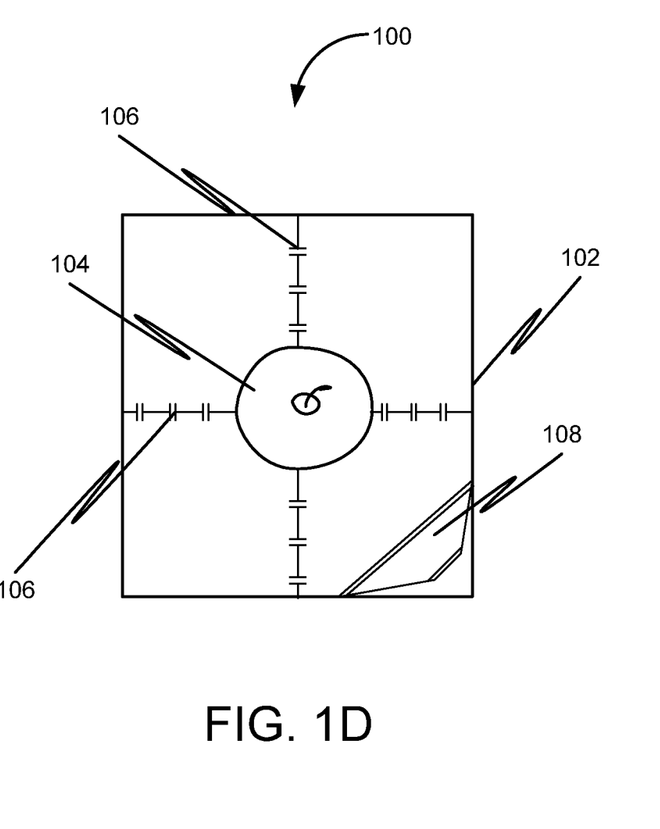

Further, the container 102 may have a turntable installed on the bottom face of the food-grading device 100. The turntable rotates the food item 104 at a predefined rate, which allows the electronic device 110 to take multiple pictures of the food item 104 from various angles. This helps in grading the food item 104 more accurately. Further, a 3D digital model of the food item 104 may be created using the multiple pictures of the food item 104 taken from various angles. FIG. 1C shows a front view of the food-grading device 100 and FIG. 1D shows a top view of the food-grading device 100.

Figure 2:
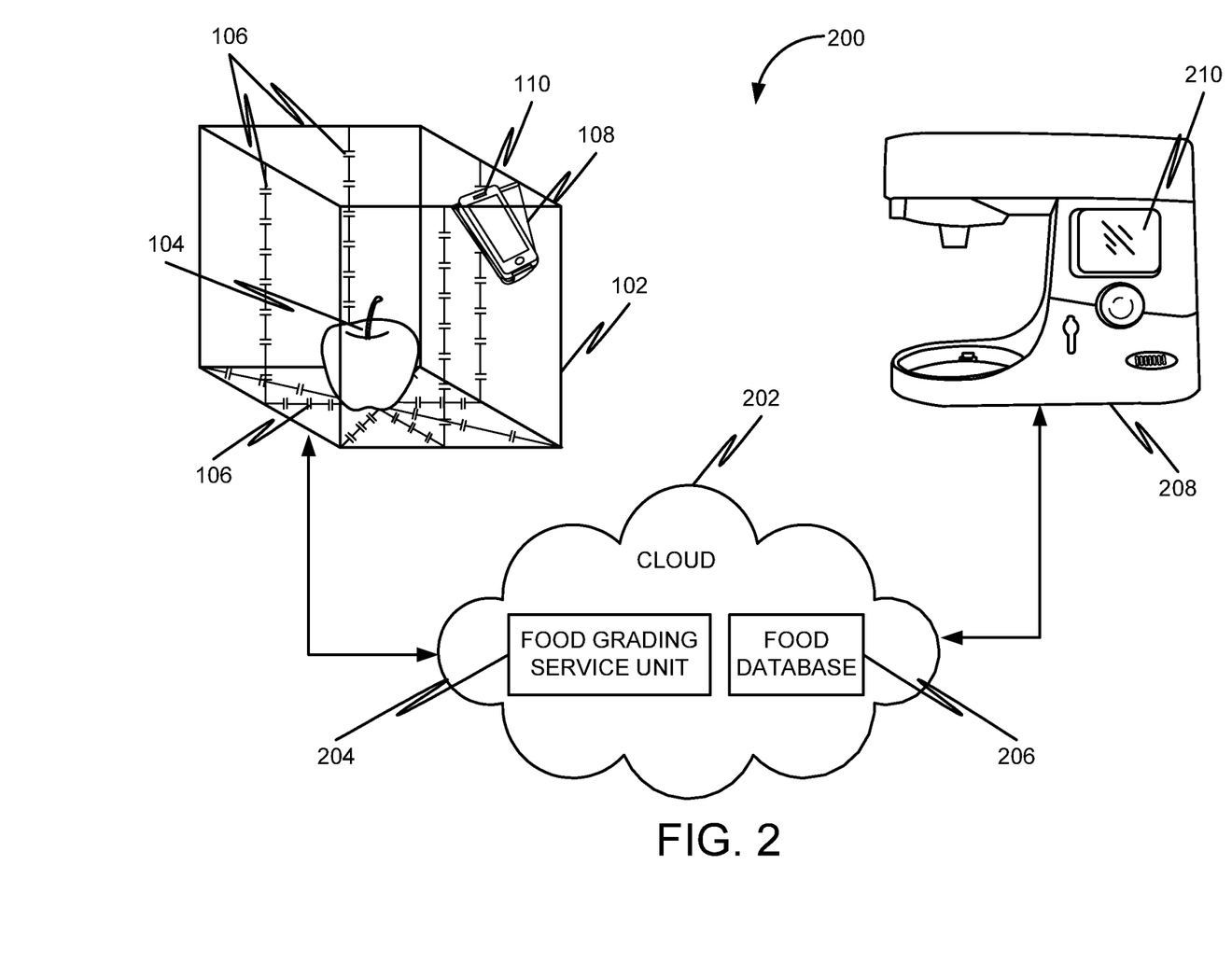
FIG. 2 is a block diagram of a food-grading system according to the present disclosure.

FIG. 2 shows a block diagram of a food-grading system 200 according to the present disclosure. The food-grading system 200 includes the food-grading device 100 connected to a cloud 202. Examples of clouds are Windows Azure™, Amazon EC2™, Bungee Connect™, Google App Engine™, and others. The cloud 202 includes a food database 206 includes details of a plurality of food items including names, pictures and contents of the food items.

Further, the cloud 202 includes a food-grading service unit 204, which receives one or more pictures for the food item 104 from the food-grading device 100. Further, the food-grading service unit 204 may also receive additional information including weight and chemical analysis report of the food item 104. Thereafter, the food-grading service unit 204 performs image processing on the one or more pictures obtained to determine the type and quantity of the food item 104. Image processing may include matching the one or more pictures of the food item 104 with the pictures available in the food database 206. For example, the food-grading service unit 204 may determine that the food item 104 is an apple based on image processing. Then, the food-grading service unit 204 may determine weight of the food item 104. Accordingly, the food-grading service unit 204 first calculates the volume occupied by the food item 104. To accomplish this, the food-grading service unit 204 obtains the position of the grading marks 106 with respect to the food item 104 from image processing. The grading marks 106 in the one or more pictures help the estimation of the size of the food item 104 in each of the three dimensions, which is used to estimate the volume of the food item 104. Alternatively, a 3D digital model of the food item 104 may be created using the one or more pictures of the food item 104; thereafter, voxels (volume pixel) may be used to determine the volume of the food item 104. Once volume is known, the food-grading service unit 204 may access the food database 206 to obtain density of the food item 104 based on the type of the food item 104 detected. Thereafter, equation (1) below may be used to determine weight of the food item 104.

$$\text{Weight} = \text{Density of the food item} \times \text{Volume of the food item} \times \text{Acceleration due to gravity} \quad (1)$$

Alternatively, the food-grading device 100 includes a weighing scale and sends the weight information to the food-grading service unit 204.

Moreover, the food database 206 may include nutritional information about each food item in the food database 206. For example, the nutritional information and other information including pictures in the food database 206 may advantageously be obtained on an ad-hoc basis depending on requirements of the food-grading service unit 204 from databases such as the U.S. Department of Agriculture (USDA) nutrient database. The nutritional information may indicate the amount of calories, carbohydrates, protein, etc. of various food items. Yet further, the food database 206 includes recipes for various food items. Therefore, the food-grading service unit 204 may provide the nutritional information about the detected food item 104 to the user and recommend recipes for the detected food item 104. This information may be sent to one or more of the electronic device 110 and a kitchen appliance 208 such that user may use these devices to access the information. This is explained in further detail in conjunction with FIG. 4 below. For example, the user may use a touch display 210 on the kitchen appliance 208 (the food processor 208) to access the information. The user may optionally use the touch display 210 to provide feedback to the food-grading service unit 204. Further, the food-grading service unit 204 may send instructions to be followed by the kitchen appliance 208 for various recipes. Yet further, the user may have a user account with the food-grading service unit 204. Accordingly, the food-grading service unit 204 may recommend recipes to balance meals of the user and to help the user achieve predetermined health goals, or on feedback received from the user or from other users. The food-grading service unit 204 may also determine quality of the food item 104 and share this information with the user.

In another embodiment, image processing may detect a barcode, which may directly provide information about type and quantity of the food item 104.

The food-grading service unit 204 also comprises a processor, coupled to the food database 206 for generating the recipe recommendations based on the detected food item 104.

In an exemplary embodiment, a user may place a cucumber in the food-grading device 100. When the cloud 202 detects the food item as cucumber, it recommends multiple recipes to the user. The recommended recipes may be displayed on the touch display 210 of the food processor 208. The user may select a recipe titled "Cold Cucumber Soup Recipe" from the recommended recipes. Thereafter, the touch display 210 displays full details (shown below) of the selected recipe including name of the recipe, number of serves, preparation time, electronic appliances required, ingredients required and the method steps.

Recipe: "Cold Cucumber Soup Recipe"
Serves: 4-6
Preparation time: 10 minutes
Can be made with these appliances: Food processor
Ingredients:
1. Cucumbers 2 (about 750 g)
2. Salt 01 tsp
3. Fresh garlic 01 to 1 clove
4. Spring onions, white 6
5. Yoghurt 115 g
6. Dill 1 tbsp
7. Buttermilk or cream 200 g
Method:
1. Peel and cut the cucumber length ways then scoop out the seeds.
2. Attach the knife blade to the food processor.
3. Place the cucumber, salt, garlic, spring onion, yoghurt and dill into the food processor bowl.
4. Process to a smooth puree on high speed.
5. To finish the soup attach the whisk.
6. Switch the machine to low speed and whisk in the buttermilk.
7. Traditionally we serve such soup in a bowl set over a bowl of ice. To finish the soup top with some chopped dill and garlic croutons.

Further, the cloud 202 may send instructions to the food processor 208 to program the food processor 208 based on the method steps. For example, the food processor 208 is programmed to process at high speed at fourth method step and then switch to low speed at sixth method step.

As the user performs the tasks corresponding to each method step, the user may select the corresponding method steps one-by-one on the touch display 210. Therefore, when user selects the method step four on the touch display 210, the food processor 208 automatically processes the food at high speed. Similarly, when the user selects the method step six on the touch display 210, the food processor 208 automatically processes the food at low speed.

It will be appreciated that, in such circumstances, the cloud 202 may send instructions to two or more kitchen appliances including food processors, blenders mixers, fryers and ovens, to program each appliance based on the method steps of a selected recipe.

In another embodiment, the touch display 210 also allows user to order one or more ingredients for a selected recipe from an online store.

Figure 3:
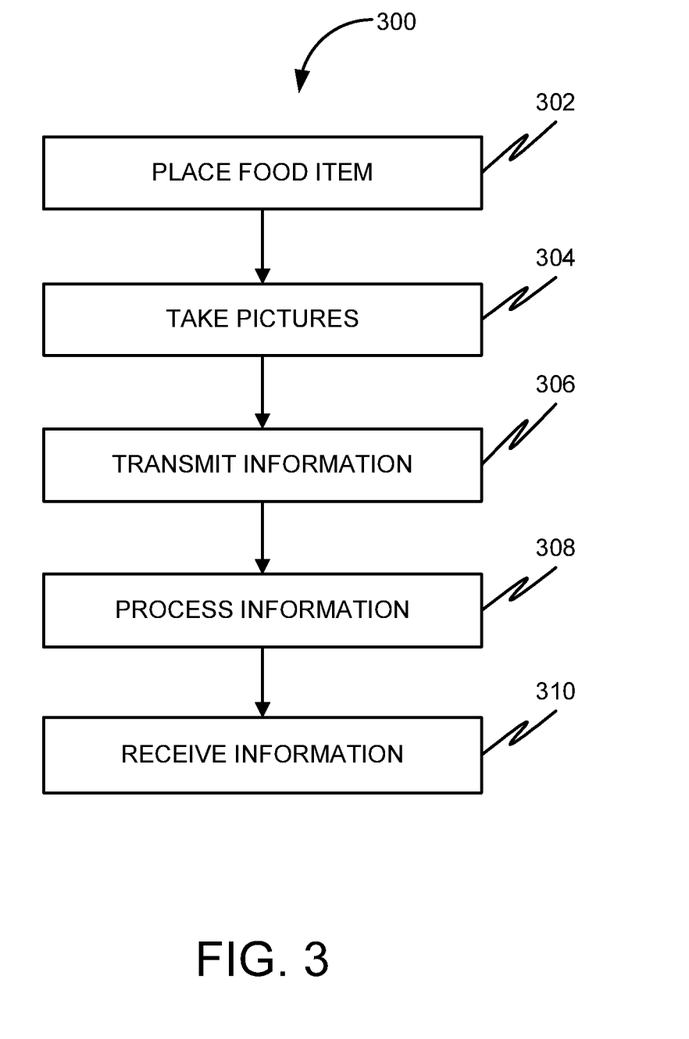
FIG. 3 is a flowchart of a method for grading food and recommending recipes according to the present disclosure.

Referring now to FIG. 3, is a flowchart 300 illustrating a method for grading food and recommending recipes according to the present disclosure. At step 302, a user places the food item 104 in the container 102. Then at step 304, the food-grading device 100 takes pictures of the food item 104 using the electronic device 110. The user may instruct the electronic device 110 to initiate taking pictures of the food item 104. Alternatively, the user may use controls (not shown) available on the food-grading device 100 to instruct the food-grading device 100 to initiate taking pictures using the electronic device 110. Further, the food-grading device 100 may determine weight using weighing scale available in the food-grading device 100. Yet further, the food-grading device 100 may perform chemical analysis of the food item 104 using available sensors that employ food-safe chemical analysis techniques.

Next at step 306, the food-grading device 100 transmits the one or more pictures and optionally the additional information obtained to the cloud 202. The additional information includes weight and chemical analysis report of the food item 104. The food-grading device 100 may directly transmit the one or more pictures and additional information to the cloud 202 through a connection to a computer network such as the Internet. Alternatively, the food-grading device 100 may instruct the electronic device 110 to transmit the one or more pictures and additional information to the cloud 202.

Optionally, to avoid unnecessary processing, the food-grading device 100 may consult a local memory (not shown) of the food grading device 100 before transmitting (or instructing the electronic device 110 to transmit) the one or more pictures or the additional information to the cloud 202. If the one or more pictures or the additional information corresponds to data already stored in the local memory of the grading device 100, the food-grading device will not transmit it to the cloud 202, but instead display nutritional information of the food item 104 and one or more stored recipes stored on the local memory of the grading device 100. Alternatively, instead of displaying the information, the food-grading device 100 could send the information to one or both of the electronic device 110 and the kitchen appliance 208. The data stored on the local memory of the grading device 100 could be previously sent to or received from the cloud 202 in a previous query and stored by the local memory of the grading device 100, or it could be preloaded data for common foodstuffs.

Once the cloud 202 receives the one or more pictures and additional information sent by the food-grading device 100, the food-grading service unit 204 available on the cloud 202 processes the one or more pictures and additional information at step 308. This includes performing image processing to determine the type and quantity of the food item 104. Further, the food-grading service unit 204 may use the food database 206 available with the cloud 202 to obtain nutritional information of the food item 104 and one or more recipes to recommend to the user. Further, the user may have an account with the food-grading service unit 204. Therefore, the food-grading service unit 204 may select recipes based on user preferences, health goals, availability of ingredients etc. Thereafter, the food-grading service unit 204 sends the information to one or more of the food-grading device 100, the electronic device 110 and the kitchen appliance 208. Finally, at step 310, the information is received at the user's end. The information may also include instructions to program the kitchen appliance 208 for various recipes.

Figure 4:
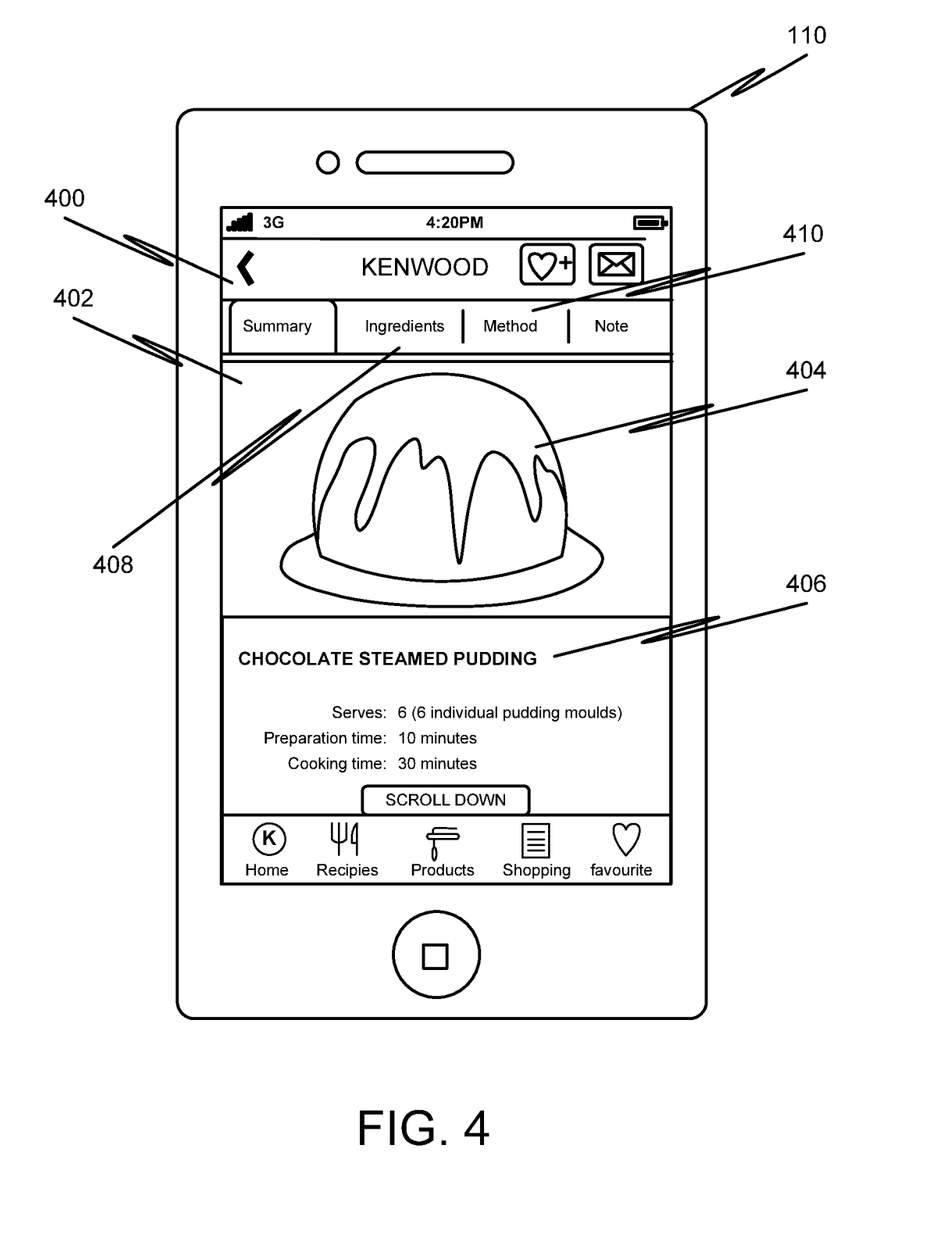
FIG. 4 illustrates a user interface of a mobile phone application that receives and displays recipes according to the present disclosure.

Referring now to FIG. 4, is a user interface 400 of a mobile phone application installed on the electronic device 110 according to an embodiment of the present disclosure. The mobile phone application receives and displays recipes recommended by the food-grading service unit 204. In an example embodiment, the mobile phone application displays a recipe 402 for "chocolate steamed pudding". The recipe 402 includes a picture 404 of the final dish. Further, the recipe 402 includes information and instructions 406 for preparing the recipe. The user may view further details using an "Ingredients" tab 408 and a "Method" tab 410. The mobile phone application may also allow the user to send the instructions 406 to one or more kitchen appliances to program the kitchen appliances for the selected recipe. The instructions 606 from the electronic device 110 may be sent to the one or more kitchen appliances via the cloud 202 or directly using a short-range wireless communication protocol such as Bluetooth, Zigbee, Infrared, Wi-Fi etc. The user interface 400 may optionally allow the user to send feedback to the food-grading service unit 204.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

What is claimed is:

1. A container system comprising:
    a container for providing an enclosure for a food item, the container having at least one opening for introducing a food item into the container, a receiving surface for the food item, and a side wall, wherein the container comprises a plurality of grading marks for indicating the size of the food item, the grading marks being provided on the receiving surface and on the side wall; and
    an electronic device spaced from the receiving surface and the side wall, the electronic device being arranged such that the device faces the interior of the container and the grading marks, wherein the device is arranged to obtain image data and deliver the image data to a processor, the processor being arranged to estimate the volume of the food item from the position of grading marks in relation to the food item.

2. The container system of claim 1, wherein the container is at least partially transparent such that the food item is visible to a user.

3. The container system of claim 1, wherein the container is shaped as one of a cube, a cuboid, a cone and a sphere.

4. The container system of claim 1, wherein the grading marks are one of an etch, a depression, a raised portion, a print, or any other visible structure.

5. The container system of claim 1, wherein the container is hermetically sealable.

6. The container system of claim 1, wherein the container device is dishwasher-safe.

7. The container system of claim 1, further comprising a weighing scale to determine weight of the food item.

8. The container system of claim 1, further comprising one or more sensors to perform chemical analysis of the food item.

9. The container system of claim 1, the container being connectable to a communication network.

10. The container system of claim 1, wherein the electronic device is one of a smart phone, a tablet, a camera, a 3D scanner and a bar code scanner.

11. The container system of claim 1, further comprising a docking station including at least one port for electronically connecting the container to the electronic device.

12. The container system of claim 1, in which the grading marks comprise a linear scale.

13. The container system of claim 12, further comprising at least two linear scales, spaced apart or intersecting at an angle.

14. The container system of claim 13, in which the scales are provided on a side wall and/or the receiving surface of the container.

15. An image processing apparatus comprising:
    an electronic device arranged to obtain image data relating to a food item, and to deliver the data to a processor, the processor being configured to:
        compare the image data with comparative data in a database;
        determine, based on the comparative data, at least one parameter of the food item;
        select, based on the at least one parameter, a recipe relating to the food item, the recipe comprising food preparation information relating to a plurality of food preparation steps, including configuration information for operating a kitchen appliance to carry out at least one of the plurality of food preparation steps;
provide the information to the kitchen appliance;
wherein the processor is configured to determine weight of the food item; and;
wherein the processor is configured to determine the weight of the food item by:
calculating the volume occupied by the food item based on grading marks visible in the one or more pictures of the food item, wherein the grading marks indicate the size of the food item in each or any of the three dimensions;
accessing the food database to obtain the density of the food item based on the type of food item; and
obtaining the weight of the food item from the density of the food item, and the volume of the food item.

16. The image processing apparatus of claim 15, wherein the processor is configured to provide the information to the electronic device.

17. The image processing apparatus of claim 15, wherein the information comprises instructions for programming a kitchen appliance.

18. The image processing apparatus of claim 15, wherein the image data comprises a bar code providing information about the type and/or quantity of the food item.

19. The image processing apparatus of claim 15, wherein:
the database comprises pictures and recipes relating to a plurality of food items; and
the processor is configured to:
determine the type and quantity of the food item;
select one or more recipes based on the type of the food item; and
transmit information about the one or more recommended recipes to the electronic device.

20. The image processing apparatus of claim 19, wherein the image data comprises one or more pictures and wherein the processor is configured to match the one or more pictures of the food item with the pictures of the plurality of food items available in the database.

21. The image processing apparatus of claim 15, wherein the processor is configured to calculate the volume occupied by the food item by creating a 3D digital model of the food item based on the one or more pictures of the food item and then enumerating the number of voxels in the 3D digital model to determine volume of the food item.

22. The image processing apparatus of claim 15, wherein the food database further includes nutritional information about a plurality of food items, wherein the nutritional information includes amount of calories, carbohydrates and protein in each food item in the plurality of food items.

23. The image processing apparatus of claim 15, wherein the information includes a speed of operation of the appliance.

24. The container system of claim 1, further comprising an image processing apparatus as claimed in claim 15.

25. An image processing apparatus comprising:
an electronic device arranged to obtain image data relating to a food item, and to deliver the data to a processor, the processor configured to:
compare the image data with comparative data in a database;
determine, based on the comparative data, at least one parameter of the food item; and
obtain, based on the at least one parameter, food preparation information relating to the food item;
wherein the processor is configured to provide the information to the electronic device and/or a kitchen appliance;
wherein the processor is configured to determine weight of the food item by:
calculating the volume occupied by the food item based on grading marks visible in the one or more pictures of the food item, wherein the grading marks indicate the size of the food item in each or any of the three dimensions;
accessing the food database to obtain the density of the food item based on the type of food item; and
obtaining the weight of the food item from the density of the food item, and the volume of the food item;
wherein the processor is configured to calculate the volume occupied by the food item by creating a 3D digital model of the food item based on the one or more pictures of the food item and then enumerate the number of voxels in the 3D digital model to determine volume of the food item.

* * * * *